(12) United States Patent
Ducher

(10) Patent No.: US 11,946,514 B2
(45) Date of Patent: Apr. 2, 2024

(54) LUBRICATION DEVICE FOR POWER TAKE OFF

(71) Applicant: Carrier Corporation, Palm Beach Gardens, FL (US)

(72) Inventor: Gael Ducher, Olivet (FR)

(73) Assignee: CARRIER CORPORATION, Palm Beach Gardens, FL (US)

(*) Notice: Subject to any disclaimer, the term of this patent is extended or adjusted under 35 U.S.C. 154(b) by 828 days.

(21) Appl. No.: 17/025,468

(22) Filed: Sep. 18, 2020

(65) Prior Publication Data
US 2021/0088086 A1    Mar. 25, 2021

(30) Foreign Application Priority Data
Sep. 20, 2019   (EP) ..................... 19198754

(51) Int. Cl.
*F16D 25/12*   (2006.01)
*B60K 17/28*   (2006.01)
(Continued)

(52) U.S. Cl.
CPC ............ *F16D 25/123* (2013.01); *B60K 17/28* (2013.01); *F16N 9/02* (2013.01);
(Continued)

(58) Field of Classification Search
CPC ......... F16D 25/123; B69K 17/28; F16N 9/02; F16N 2210/04; B60K 2025/026; B60Y 2306/03
(Continued)

(56) References Cited

U.S. PATENT DOCUMENTS

| 4,026,386 A | 5/1977 | Therkildsen |
| 6,224,289 B1 * | 5/2001 | Redd ............... B60K 25/06 403/337 |

(Continued)

FOREIGN PATENT DOCUMENTS

| JP | H061790 U | * | 1/1994 |
| KR | 20120032240 A | * | 4/2012 |

OTHER PUBLICATIONS

KR20120032240A (Kyun et al.) (Apr. 5, 2012) (Machine Translation) (Year: 2012).*

(Continued)

*Primary Examiner* — Mahmoud Gimie
(74) *Attorney, Agent, or Firm* — CANTOR COLBURN LLP

(57) ABSTRACT

A lubrication device for a power take off coupling for a prime mover, the lubrication device including: a lubrication device shaft having a first end for connecting to an output shaft of the prime mover and a second end for connecting to an input shaft for receiving power from the output shaft; a lubricant chamber surrounding at least part of the lubrication device shaft between the first end and the second end; and a housing enclosing the lubrication device shaft and the lubricant chamber; wherein the lubrication device shaft includes a plurality of internal lubricant passages for conveying lubricant from the lubricant chamber to the first end and the second end of the lubrication device shaft, with the internal lubricant passages comprising fluid passages extending along the axial length of the lubrication device shaft as well as fluid passages extending radially to outer surfaces of the lubrication device shaft.

15 Claims, 7 Drawing Sheets

(51) Int. Cl.
   *B60K 25/02*     (2006.01)
   *F16N 9/02*      (2006.01)
(52) U.S. Cl.
   CPC ..... *B60K 2025/026* (2013.01); *B60Y 2306/03* (2013.01); *F16N 2210/04* (2013.01)
(58) Field of Classification Search
   USPC .......................................................... 464/16
   See application file for complete search history.

(56) References Cited

U.S. PATENT DOCUMENTS

| | | |
|---|---|---|
| 7,146,810 B1 | 12/2006 | Hauser et al. |
| 10,428,844 B1 * | 10/2019 | Holt .......................... B60P 3/20 |
| 10,682,897 B2 * | 6/2020 | Lucht ................... B60H 1/3222 |
| 2011/0113739 A1 | 5/2011 | Scuffham et al. |
| 2015/0246593 A1 * | 9/2015 | Larson ............... B60H 1/00428 |
| | | 62/236 |
| 2017/0217280 A1 * | 8/2017 | Larson ............... B60H 1/00764 |

OTHER PUBLICATIONS

JPH061790U (Jan. 14, 1994) (Machine Translation) (Year: 1994).*
European Search Report for Application No. 19198754.4; dated Mar. 20, 2020; 5 Pages.

* cited by examiner

LUBRICATION DEVICE FOR POWER TAKE OFF

FOREIGN PRIORITY

This application claims priority to European Patent Application No. 19198754.4, filed Sep. 20, 2019, and all the benefits accruing therefrom under 35 U.S.C. § 119, the contents of which in its entirety are herein incorporated by reference.

TECHNICAL FIELD OF INVENTION

The present invention relates to a lubrication device for a power take off coupling as well as to a related method for lubrication of a power take off coupling.

BACKGROUND OF THE INVENTION

Power take off couplings are used to utilise energy from a prime mover such as a conventional engine (e.g. a combustion engines) for other systems, such as for a refrigeration system. Such systems are particularly useful in logistics, as vehicle engines can be used to provide power to other systems.

For example, vehicle engines can be used to power transport refrigeration units (TRU). In one known system the power take off motor of a truck is used to power a hydraulic pump that in turn powers a generator for a refrigeration unit. This is often referred to as "engineless" power. In this way, dedicated engines are not required to refrigerate cargo in vehicles, as all of the necessary power for refrigeration is provided by the combustion engine of the vehicle.

Existing systems for power take off couplings in refrigeration vehicles comprise a power take off (PTO) unit that transmits power from the engine. The PTO is coupled to a shaft for providing power to a refrigeration system, such as the shaft of a hydraulic pump. The coupling between the PTO and the pump shaft comprises splines on the exterior of the pump shaft and mating splines on the interior of the PTO which mesh together to transmit torque from the PTO to the pump shaft.

These splines must be kept lubricated during use to prevent wearing of the coupling and damage to the PTO and/or to the pump.

Existing solutions for lubricating the PTO coupling include dry couplings that are greased during installation; however, this grease must be changed approximately every six months and problems associated with such dry systems include the maintenance burden of changing the grease regularly as well as an increased risk to damage to the PTO and/or to the pump if the maintenance is done poorly or omitted by mistake.

SUMMARY OF THE INVENTION

Viewed from a first aspect, the invention provides a lubrication device for a power take off coupling for a prime mover, the lubrication device comprising: a lubrication device shaft having a first end for connecting to an output shaft of the prime mover and a second end for connecting to an input shaft for receiving power from the output shaft; a lubricant chamber surrounding at least part of the lubrication device shaft between the first end and the second end; and a housing enclosing the lubrication device shaft and the lubricant chamber; wherein the lubrication device shaft includes a plurality of internal lubricant passages for conveying lubricant from the lubricant chamber to the first end and the second end of the lubrication device shaft, with the internal lubricant passages comprising fluid passages extending along the axial length of the lubrication device shaft as well as fluid passages extending radially to outer surfaces of the lubrication device shaft.

By conveying lubricant from a lubricant chamber of the device through the plurality of internal lubricant passages, the device and power take off coupling can be kept lubricated without human intervention once the device has been installed and thus reducing maintenance requirements.

The power take off coupling may be a power take off for a transport refrigeration unit (TRU) and the prime mover may be the engine of a vehicle/truck. In this way, the power take off coupling can be used to power the refrigeration of the TRU without a dedicated second engine being required for this purpose, such an arrangement is referred to in the art as a Transport Engineless Refrigeration Unit (TERU)

The lubrication device shaft may comprise a first set of splines at the first end for connecting to the output shaft and a second set of splines at the second end for connecting to the input shaft and the first end and the second end of the lubrication device shaft may have a paired male and female configuration such that the first end would be capable of mating with the second end.

In this way, the first and second set of splines can be designed such that they will fit a particular, existing, power take off coupling. For example, as mentioned above, existing power take off couplings utilise a paired male and female splines for transmitting torque from a PTO to a pump shaft, and the first and second set of splines could be designed/chosen to fit with such an existing coupling, thus reducing the amount of redesigning necessary to fit the lubrication device to an existing power take off coupling. Such a lubrication device could be retrofit to an existing power take off coupling.

The first and/or second set of splines may extend at least partially, or all of the way along the axial length of the device shaft.

The first and/or second set of splines may be internal splines that extend radially inward from an interior surface of the lubrication device shaft or external splines that extend radially outward from an exterior surface of the lubrication device shaft. The first and/or second set of splines may extend all the way around the circumference of the device shaft. There may be 5, 10, or 20 or more splines arranged around a circumference of the device shaft.

Some or all of the fluid passages extending along the axial length of the lubrication device shaft (axially extending passages) may be provided by the first set of splines and/or the second set of splines.

In particular, these splines may be configured such that they convey lubricant in the valley between each spline, along their length (i.e. along the axial length of the device shaft).

The lubrication device may comprise a lubrication inlet for providing oil to the lubricant chamber and a lubrication outlet for removing oil from the lubricant chamber. In particular, the inlet and outlet may be arranged such that the lubrication inlet provides oil from a lubrication system separate to the device (e.g. a lubrication system of the prime mover or a lubrication device of a power take off unit) and the lubrication outlet returns oil to the lubrication system of the prime mover; or wherein the lubrication inlet and lubrication outlet are removably sealed.

In the first instance, by providing an inlet and outlet in arranged to supply oil from/return oil to a lubrication system of the prime mover, lubricant can be circulated when the device is in use. For example, the lubricant could be oil from an oil lubrication system of the prime mover, such as a typical oil lubrication system of an engine. In this way, existing lubrication systems can be utilised. In the second instance, by providing an inlet and outlet that are removably sealed lubricant can be periodically drained from the outlet and lubricant can be periodically replaced at the inlet without then need to remove the lubrication device from the power take off coupling, thus reducing the complexity of maintenance.

It will be appreciated that the plurality of internal passages may be configured in any way to convey lubricant to the necessary places and components in the lubrication device and power take off coupling. For example, the internal passages may be arranged to convey oil to the first and/or second end of the lubrication device shaft at the point at which the lubrication device shaft couples with the output shaft of the prime mover and an input shaft for receiving power respectively. In this way, both couplings are kept lubricated.

There may be fluid passages extending radially to outer surfaces of the lubrication device shaft (radially extending passages) located at multiple points around the circumference of the lubrication device shaft and there may be fluid passages extending radially at multiple points along some or all of the axial length of the lubrication device shaft. For example, there may be 5, 10 or 20 or more radially extending passages around a circumference of the device shaft and 5, 10 or 20 or more located along an axial length of the device shaft; this would provide a total number of radially extending passages of 25, 100, or 400 or more.

Some or all of the radially extending passages may be located in the valleys between splines on the device shaft. In particular, there may be at least one passage located in each valley such that all of the splines and valleys are kept in a lubricated state. This also helps the splines (in particular the valleys) to act as axially extending passages to convey lubricant.

Some or all of the fluid passages extending radially may pass through the entire cross-section of the device shaft; such that they extend from one external surface of the device shaft to the other. In this way the radially extending passages can convey lubricant all the way (radially) through the device shaft.

The lubrication device shaft may be at least partially hollow, defining an axial chamber within the lubrication device shaft which forms part of the plurality of the plurality of internal lubricant passages. The axial chamber may extend to one end of the device shaft such that the axial chamber could be used in one or both of the couplings by fitting the output shaft of the prime mover or the input shaft for receiving power into the chamber. There may be radially inward extending splines on the interior surface of the axial chamber for this purpose.

Some or all of the radially extending passages may pass from one external surface of the device shaft to the axial chamber. In this way, lubricant can be conveyed to and from the axial chamber and the axial chamber can act as part of the radially extending passage and the axially extending passages.

The housing may include bearings for supporting the lubrication device shaft, and the plurality of lubricant oil passages may comprise lubricant oil passages for conveying lubricant to the bearings. In this way, the lubricant device can be utilised to also keep the bearings lubricated.

The lubricant chamber may extend around some or all of the circumference of the device shaft, above the lubrication device shaft and below the lubrication device shaft, and the plurality of internal lubricant passages may comprise internal lubricant passages in communication with a portion of the lubricant chamber extending above the lubrication device shaft and a portion of the lubricant chamber extending below the lubrication device shaft. In this way, lubricant can be conveyed all the way around and through the device shaft ensuring the entire shaft is kept lubricated.

The housing may comprise a first portion and a second portion which are removably attached by one or more fixtures. These two portions may enclose the lubrication device shaft. The housing may also be fixed in place, for example by attaching it to the housing of a separate component (e.g. the housing of a hydraulic pump that is powered by the input shaft) in order to prevent it from moving, in particular to prevent it from rotating. In this way, the lubrication chamber can be kept stationary relative to the rotating device shaft such that the internal passages/splines convey the around the lubrication chamber as the device shaft rotates. For example, the splines could carry lubricant from a portion of the lubricant chamber below the shaft to a portion of the lubricant chamber above the shaft as the shaft rotates.

Viewed from a second aspect, the invention provides a lubrication system comprising any one of the lubrication devices according to the first aspect; the output shaft and the input shaft, wherein the lubrication device is coupled to the output shaft of a prime mover and to the input shaft in order to form a power take off coupling.

The lubrication system may comprise the prime mover and a hydraulic pump for a refrigeration system, wherein the hydraulic pump includes the input shaft; and wherein the lubrication device housing is fixed to a housing of the prime mover and/or to a housing of the hydraulic pump.

According to a third aspect, the invention provides a vehicle for refrigerated transport of goods comprising any lubrication system according to the second aspect and a transport refrigeration unit, wherein the transport refrigeration unit is powered via the power received by the output shaft. For example, the vehicle could be a tractor and refrigerated trailer or tractor and trailer for carrying a refrigerated container (e.g. a shipping container). In this way, the invention also extends to a transport refrigeration unit including a power take off apparatus having a lubrication device according to the first aspect. This may provide "engineless" power as previously described. In this way, dedicated engines are not required to refrigerate cargo in vehicles, as all of the necessary power for refrigeration is provided by the combustion engine of the vehicle.

According to a fourth aspect, the invention provides a method for lubrication of a power take off coupling, the method comprising: providing any lubrication device according to the first aspect and connecting the lubrication device shaft to the output shaft at the first end and to the input shaft at the second end.

The method may form a lubrication system according to the second aspect and/or a vehicle for refrigerated transport of goods according to the third aspect.

The method may comprise retrofitting the lubrication device to an existing power take off coupling. For example, as mentioned above, existing power take off couplings utilise a paired male and female splines for transmitting torque from a PTO to a pump shaft and the first and second set of splines could be designed/chosen to fit with such an existing coupling, thus reducing the amount of redesigning necessary to fit the lubrication device to an existing power take off coupling.

BRIEF DESCRIPTION OF THE DRAWINGS

Certain example embodiments will now be described by way of example only and with reference to the accompanying drawings, in which.

DETAILED DESCRIPTION OF THE INVENTION

The following embodiments are described with reference to a power take off coupling of a vehicle for powering a refrigeration system, such as by powering a hydraulic pump in an "engineless" refrigeration system for refrigerated vehicles. However, it will be appreciated that the systems described are applicable to power take off couplings taking any form in which a "dry" type shaft connection may be employed.

Figure 1:
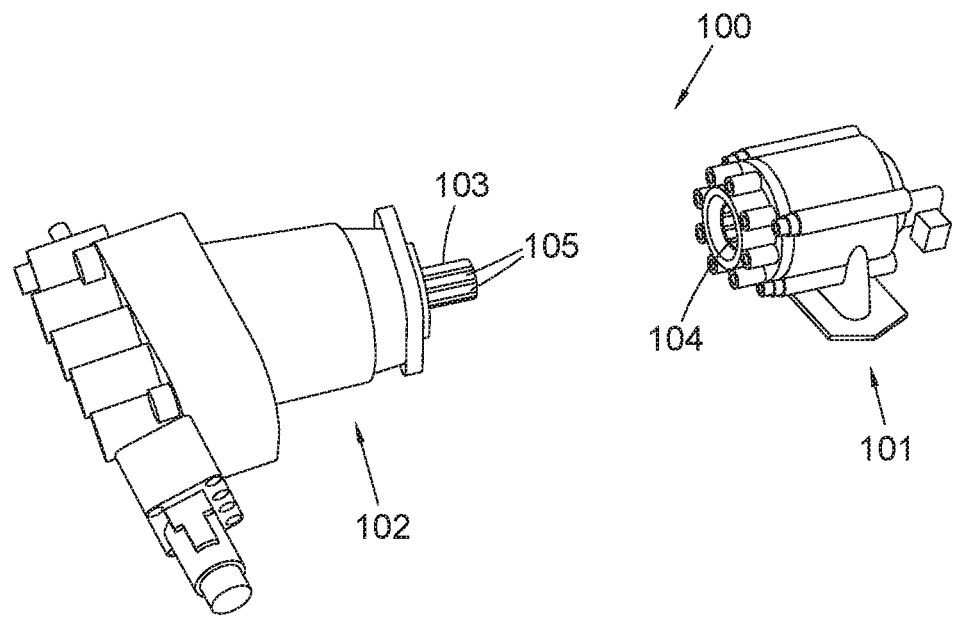
FIG. 1 shows a perspective view of a conventional dry PTO coupling known in the art.

A conventional power take off coupling 100 is shown in FIG. 1. The coupling comprises power take off unit (PTO) 101 and hydraulic pump 102. In this example the connection between the PTO 101 and the pump 102 uses a splined shaft, but it will be appreciated that other forms of shaft might be used, such as a hexagonal shaft for example. The PTO is powered by the combustion engine of a vehicle (not shown) and transmits torque to a drive shaft 103 of the pump 102 via a series of splines 104 on the interior of the PTO that mate with splines 105 on the exterior of the drive shaft 103 of the pump 102.

The splines 104, 105 must be kept lubricated to prevent excessive wear and damage to the PTO 101 and/or the pump 102. Typically, this is achieved by applying grease to the splines. Such grease must be checked and replaced regularly (e.g. every 6 months). If the grease is applied incorrectly, or it is not replaced, the PTO and pump are prone to damage during use.

Figure 2:
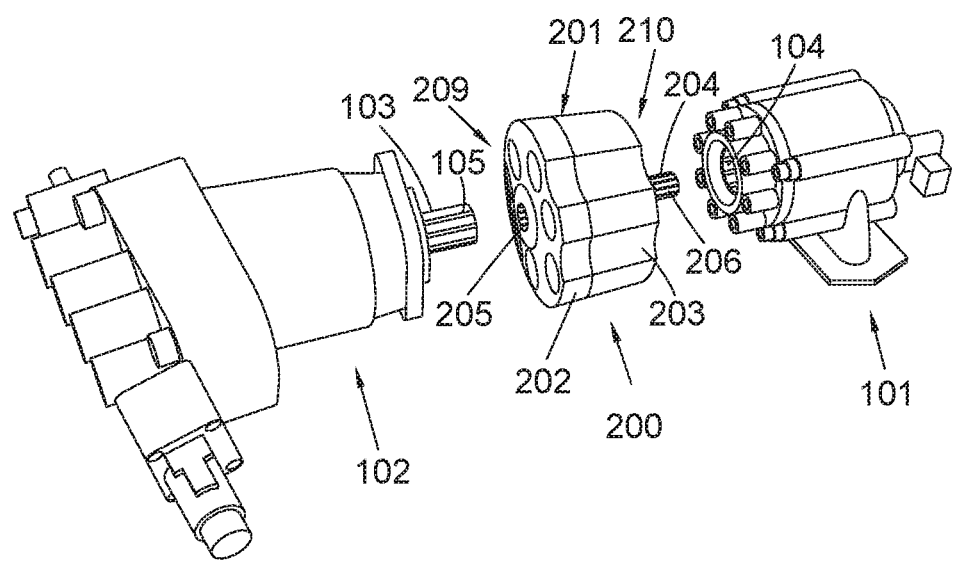
FIG. 2 shows a perspective view of a lubrication device according to the present invention in combination with the PTO coupling shown in FIG. 1.

FIG. 2 shows a lubrication device 200 that removes the need for a grease to be applied and re-applied to the splines of the 104, 105 of the coupling shown in FIG. 1. The lubrication device 200 comprises a housing 201 that is formed from a first half 202 and second half 203 enclosing a lubrication device shaft 204. The lubrication device shaft 204 receives and distributes lubricant, for example oil, from a lubrication chamber 305 of the lubrication device 200, as described in further detail below and as shown in FIGS. 3a to 3c.

The lubrication device shaft 204 couples to the PTO 101 at one end (PTO end 210) and to the pump 102 at the other end (pump end 209). The couplings between the lubrication device shaft 204 and the PTO 101, and the lubrication device shaft 204 and the pump shaft 103 have a geometry that corresponds to the conventional coupling described above in relation to the prior art power take off coupling. Advantageously, this allows for retrofit of the lubrication device 200 without any modification to existing PTO 101 and hydraulic pump 102 arrangements. There are splines 206 on the exterior of the shaft 204 of the lubrication device that mate with the splines 104 of the PTO and splines 205 on the interior of the lubrication device shaft 204 that couple to splines 105 on the exterior of the pump shaft 103. In this way, the lubrication device 200, specifically the lubrication device shaft 204, transmits torque from the PTO 101 to the pump 102. The two respective splined connections are similar to the splined connection described above in relation to the conventional PTO coupling.

As the couplings of the splines 205 between the lubrication device shaft 204 and the PTO 101 and pump shaft 103 respectively are similar to a conventional coupling such as that described in relation to FIG. 1, then the lubrication device 200 can be fitted to a conventional power take off coupling without having to adapt the pump shaft 103, the PTO 101, or their respective splines. In this way, the lubrication device 200 can be retrofitted to existing vehicles with PTO couplings. It will be understood that different forms of shaft connection can be used for variations of the lubrication device 200 that are intended to fit with different forms of PTO shaft/coupling, e.g. from different truck manufacturers.

Figure 3:
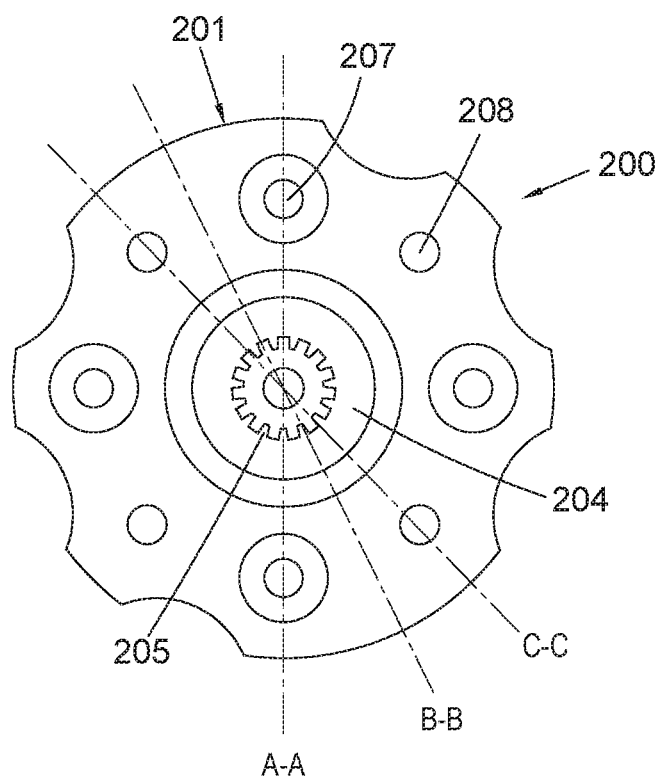
FIG. 3 shows an orthogonal view of the lubrication device show in FIG. 2, viewed from the pump side.
Figure 3A:
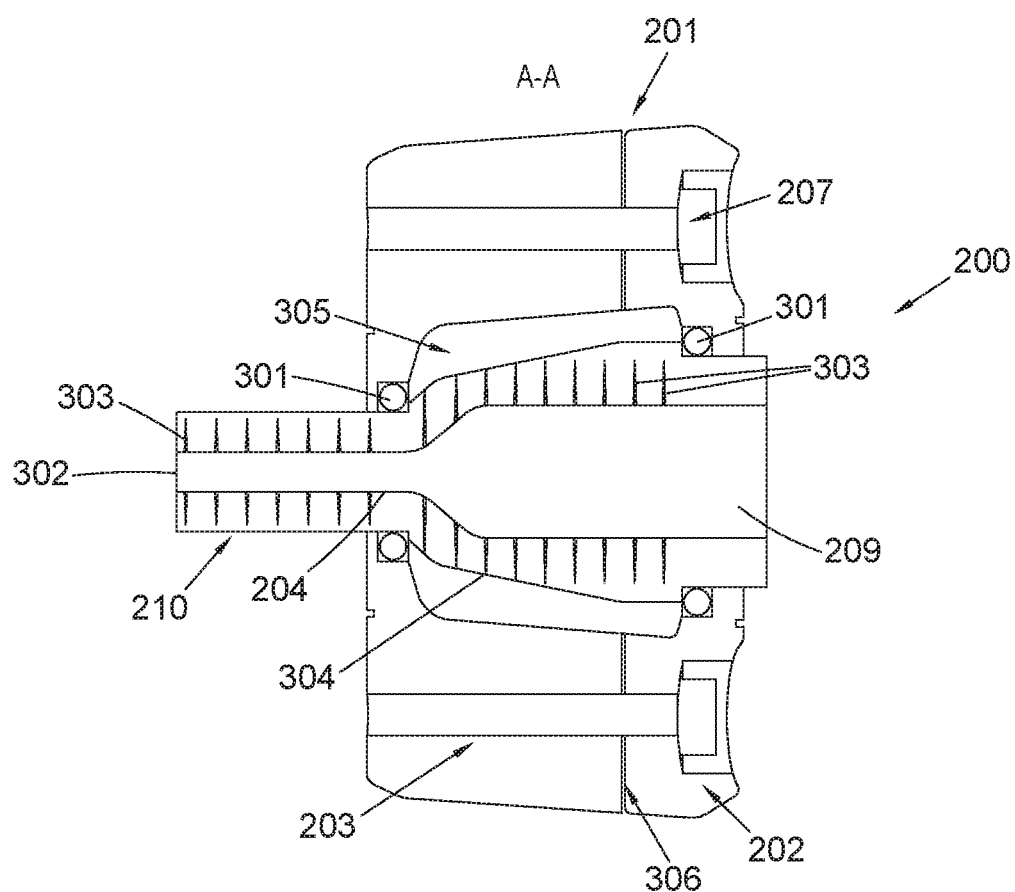
FIG. 3a shows a cross-section through line A-A of the lubrication device shown in FIG. 3.
Figure 3B:
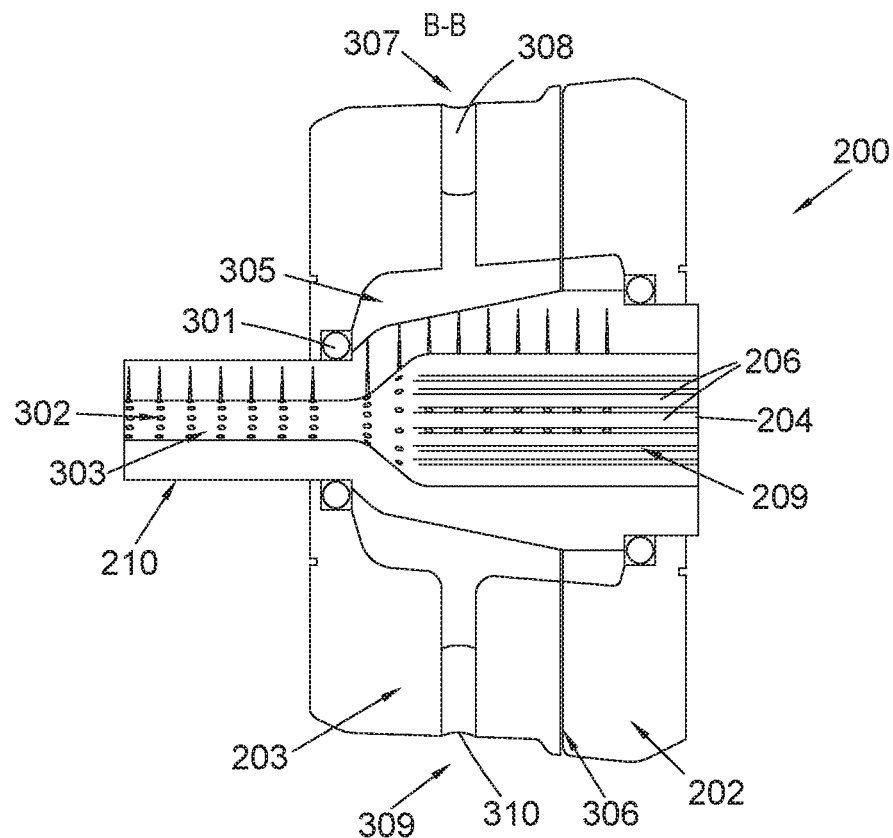
FIG. 3b shows a cross-section through line B-B of the lubrication device shown in FIG. 3
Figure 3C:
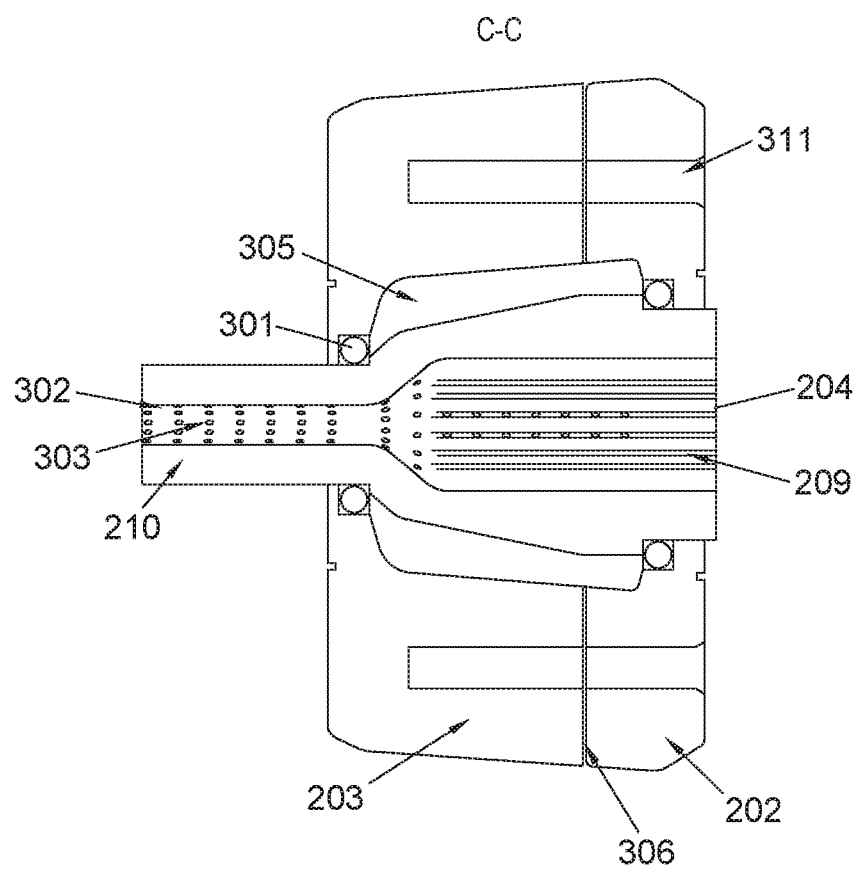
FIG. 3c shows a cross-section through line C-C of the lubrication device shown in FIG. 3.

An orthogonal view of lubrication device 200 from the pump side 209 is shown in FIG. 3. Here, the spines 205 of the lubrication device shaft 204 can be seen more clearly. Screws 207 can also be seen which hold the two sections 202, 203 of the housing 201 together to enclose the lubrication device shaft 204. When the screws 207 are removed, the two halves of the housing 202, 203 can be separated allowing for easy access and removal of the lubrication device shaft 204 for maintenance or repair.

Pump anchorages 208 are also shown which are used to fix the lubrication device 200 to the pump 102 in order to prevent it from moving relative to the pump 102; in particular to prevent it from rotating when in use.

FIG. 3a shows a cross-section of lubrication device 200 through the line A-A shown in FIG. 3. Here, the lubrication device 200 is orientated with the PTO side 210 on the left had side of the Figure and the pump side 209 on the right. Once again, screws 207 can be seen holding the two sections 202, 203 of the housing 201 together to enclose the lubrication device shaft 204.

There are bearings 301 that support the lubrication device shaft 204 within the housing and allow it to rotate along its axis. In this case the lubrication device 200 includes two bearings 301, one supporting each end of the lubrication device shaft 204. These bearings 301 can receive lubricant from the lubrication chamber 305.

Lubrication device shaft 204 is partially hollow, and defines an axial cavity 302 in its interior. The pump shaft 103 at least partially fits inside of this axial cavity 302 from the pump side 209 to mate with the lubrication device shaft via splines as described above.

Lubrication device shaft 204 also comprises a plurality of lubrication channels 303 along its length that pass radially from the axial cavity 302 to the exterior surface 304 of the lubrication device shaft 204.

The lubrication device 200 further comprises the lubrication chamber 305, which is in fluid communication with the lubrication channels 303 and axial cavity 302. The lubrication chamber 305 is filled with a lubrication fluid such as oil, is sealed at its ends by respective seals and contained within the housing 201 of the lubrication device 200 such that the lubrication fluid passes through the lubrication channels 303 and into the axial cavity 302 of the lubrication device shaft 204. A seal 306 prevents the lubricant from leaking between the two sections 202, 203 of the housing 201.

The flow of lubricant will now be described in more detail with reference to FIG. 3b.

FIG. 3b shows a cross-section of lubrication device 200 through the line B-B shown in FIG. 3. Again, the lubrication device 200 is orientated with the PTO side 210 on the left of the figure and the pump side 209 on the right. However, here the lubrication device shaft 204 is shown in perspective view so that the splines 206 on its exterior can be seen more clearly.

The housing 201 of the lubrication device comprises a lubrication inlet 307 at the top of the housing which is in fluid communication with the lubrication chamber 305. Lubrication fluid can be introduced into the lubrication chamber via this inlet 307 and the inlet 307 can be sealed with a removable sealing member 308.

The lubrication device 200 also comprises a lubrication outlet 310 at the bottom of the housing 201 that is fluid communication with the lubrication chamber 305. The outlet 310 is also sealed with a removable sealing member 310.

The device 200 is arranged to be installed in the orientation shown in FIG. 3b such that the action of gravity causes lubrication from the inlet 307 to flow into the lubrication chamber 305, lubrication channels 303 and axial chamber 302. From the axial chamber 302, lubrication fluid can also travel axially to the ends of the lubrication device shaft 204, and radially outwardly back through the lubrication channels 303 in order to lubricate the portions of the lubrication device shaft 204 (such as the splines 206) that mate with the pump shaft 103 and the PTO 101 respectively. In this way, the entire power take off coupling can be maintained in a lubricated state using a single lubricant inlet 308 and the lubricant chamber 305.

The device is also arranged such that lubricant can be drained through the lubrication outlet 309 under the action of gravity. In this way, the lubricant is easily drained and replaced thereby making it easier to carry out routine maintenance including the periodic refilling/replacement of the lubricant. With this arrangement the lubricant chamber 305 can hold sufficient lubricant to maintain a required lubrication of the shaft connections to avoid/reduce the risk of damage in intervals between servicing of the vehicle/and/or between maintenance of the refrigeration system.

In alternative embodiments, the lubricant inlet 307 is connected to a pressurised lubricant source, and the lubricant outlet 309 may be connected to a lubricant sump such that lubricant is constantly flowing through the device. For example, the lubricant inlet 307 is fluidly connected to a (low pressure) oil supply from the engine of a vehicle for circulation of oil lubricant, and the outlet is fluidly connected to the oil sump. That can reduce the maintenance required for the lubrication device 200 provided that a suitable oil supply is present on the vehicle. Such a configuration is described in more detail below, with reference to FIG. 4.

FIG. 3c shows a cross-section of lubrication device 200 through the line C-C shown in FIG. 3. Again, the lubrication device 200 is orientated with the PTO side 210 on the left of the figure and the pump side 209 on the right and similar to FIG. 3b, the lubrication device shaft 204 is shown in perspective view so that the splines 206 and the lubrication channels 303 on its exterior can be seen more clearly.

Here, pump anchorages 311 can be seen that pass through both sides of the housing and are used to attach the lubrication device housing 201 to the pump 102. The lubrication device is attached to the pump 102 so that it does not rotate during use and such that the lubrication inlet 307 is always located on the top side of the device and the lubrication outlet 309 is located on the bottom side of the device. This allows for the flow of lubrication fluid via gravity as discussed above.

With the housing 201 (and thus the device) fixed in place relative to the pump, the device also provides the advantage of circulating the lubricant within the interior of the device using the lubrication device shaft 204. For example, splines 206 can carry lubricant from the lower portion of lubricant chamber 305 to the top portion of the lubricant chamber 305 as the lubrication device shaft 204 rotates.

Figure 4:
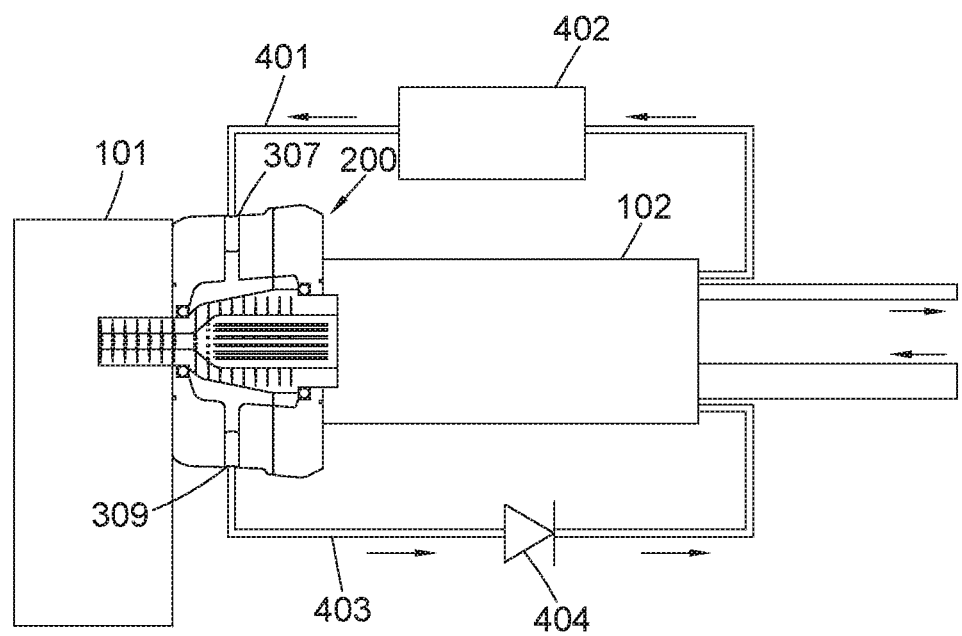
FIG. 4 shows the lubrication device connected to a lubricant system.

FIG. 4 shows the lubrication device 200 situated between the pump 102 and the PTO 101, and supplied with lubricant via a lubrication system. The lubricant inlet 307 is connected via a line 401 which supplies pressurised lubricant from a lubricant supply at the pump 102. The pressure of the lubricant is limited by a pressure limitation valve 402. The lubricant outlet 309 is connected via a line 403 back to a lubricant return at the pump 102 to form a complete circuit for the flow of lubricant such that lubricant is constantly flowing through the lubrication device 200. A valve 404 can control the rate of flow.

Figure 5:
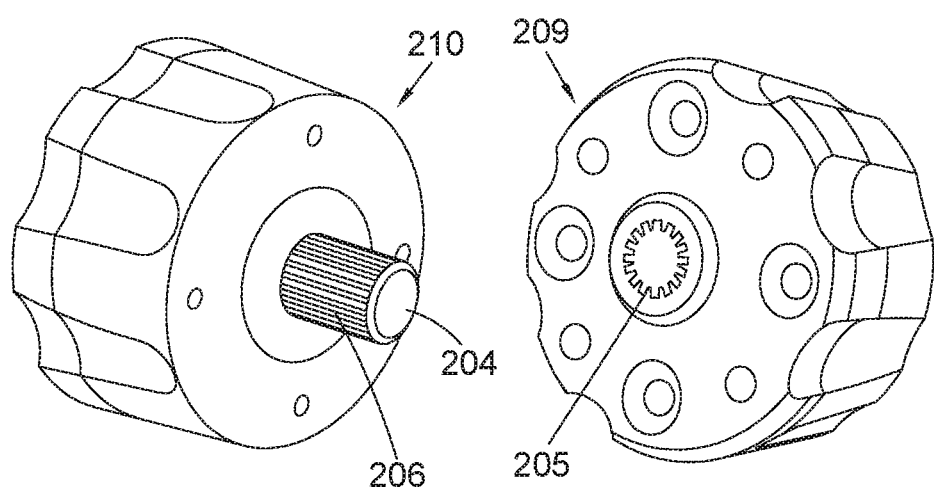
FIG. 5 shows two further perspective views of the lubrication device shown in FIGS. 2, 3 and 3a to 3c.

FIG. 5 shows two further perspective views of the lubrication device 200 described above. From these views it is evident that the two shafts are male and female versions of the same connection type and geometry, i.e. that the lubrication device 200 could in effect mate with itself. This arises since the lubrication device 200 is advantageously arranged to fit in-line with an existing PTO coupling without the need for modification of the PTO coupling.

What is claimed is:

1. A lubrication device for a power take off coupling for a prime mover, the lubrication device comprising:
    a lubrication device shaft having a first end for connecting to an output shaft of the prime mover and a second end for connecting to an input shaft for receiving power from the output shaft;
    a lubricant chamber surrounding at least part of the lubrication device shaft between the first end and the second end;
    and
    a housing enclosing the lubrication device shaft and the lubricant chamber;
    wherein the lubrication device shaft includes a plurality of internal lubricant passages for conveying lubricant from the lubricant chamber to the first end and the second end of the lubrication device shaft, with the internal lubricant passages comprising fluid passages extending along the axial length of the lubrication device shaft as well as fluid passages extending radially to outer surfaces of the lubrication device shaft.

2. The lubrication device of claim 1, wherein the lubrication device shaft comprises a first set of splines at the first end for connecting to the output shaft and a second set of splines at the second end for connecting to the input shaft.

3. The lubrication device of claim 1, wherein the first end and the second end of the lubrication device shaft have a paired male and female configuration such that the first end would be capable of mating with the second end.

4. The lubrication device of claim 1, comprising:
   a lubrication inlet for providing oil to the lubricant chamber; and
   a lubrication outlet for removing oil from the lubricant chamber,
   wherein the lubrication inlet provides oil from a lubrication system of the prime mover and the lubrication outlet returns oil to the lubrication system of the prime mover; or
   wherein the lubrication inlet and lubrication outlet are removably sealed.

5. The lubrication device of claim 1, wherein the power take off coupling is for a transport refrigeration unit and the prime mover is the engine of a vehicle.

6. The lubrication device of claim 1, wherein the housing includes bearings for supporting the lubrication device shaft, and wherein the plurality of lubricant oil passages comprises lubricant oil passages for conveying lubricant to the bearings.

7. The lubrication device of claim 1, wherein the lubricant chamber extends around the circumference of the device shaft, above the lubrication device shaft and below the lubrication device shaft, and wherein the plurality of internal lubricant passages comprises internal lubricant passages in communication with a portion of the lubricant chamber extending above the lubrication device shaft and a portion of the lubricant chamber extending below the lubrication device shaft.

8. The lubricant device of claim 1, wherein the lubrication device shaft is at least partially hollow, defining an axial chamber within the lubrication device shaft which forms part of the plurality of the plurality of internal lubricant passages.

9. The lubricant device of claim 1, wherein the plurality of internal lubricant passages are configured to propel lubricant to components that require lubrication.

10. The lubricant device of claim 1, wherein the housing comprises a first portion and a second portion which are removably attached by one or more fixtures.

11. A lubrication system comprising the lubrication device of claim 1; the output shaft and the input shaft, wherein the lubrication device is coupled to the output shaft of a prime mover and to the input shaft in order to form a power take off coupling.

12. The lubrication system of claim 11, comprising the prime mover and a hydraulic pump for a refrigeration system, wherein the hydraulic pump includes the input shaft; wherein the lubrication device housing is fixed to a housing of the prime mover and/or to a housing of the hydraulic pump.

13. A vehicle for refrigerated transport of goods comprising the lubrication system of claim 11 and a transport refrigeration unit, and wherein the transport refrigeration unit is powered via the power received by the output shaft.

14. A method for lubrication of a power take off coupling, the method comprising:
   providing a lubrication device according to claim 1 and connecting the lubrication device shaft to the output shaft at the first end and to the input shaft at the second end.

15. The method of claim 14, comprising retrofitting the lubrication device to an existing power take off coupling.

* * * * *